United States Patent [19]

Leon

[11] Patent Number: 4,898,362
[45] Date of Patent: Feb. 6, 1990

[54] THRUST ACTUATED CONTROL FOR MOTOR OPERATED VALVE

[75] Inventor: Robert L. Leon, Roslyn, Pa.

[73] Assignee: Liberty Technology Center, Inc., Conshohocken, Pa.

[21] Appl. No.: 304,983

[22] Filed: Jan. 31, 1989

[51] Int. Cl.$^4$ ............................................. F16K 31/04
[52] U.S. Cl. .................................. 251/129.12; 318/469
[58] Field of Search ................... 251/129.12; 318/468, 318/469

[56] References Cited

U.S. PATENT DOCUMENTS 1,974,335  9/1934  Kimball .......................... 251/129.12
3,079,750  3/1963  Leach .......................... 251/129.12 X Primary Examiner—Alan Cohan
Attorney, Agent, or Firm—Panitch Schwarze Jacobs & Nadel

[57] ABSTRACT

The present invention comprises a thrust actuated control for use in a motor operated valve having a motor operator including a motor drive, a stem nut coupled to the motor drive for rotation about an axis and a stem nut lock coupled to the motor drive for preventing axial movement of the stem nut. The valve includes a valve gate, a valve seat and a valve stem coupled to the valve gate, the valve stem threadingly engaging the stem nut for axial movement in a first direction upon rotation of the stem nut in a first direction to move the valve gate toward and into engagement with the valve seat and for axial movement in a second direction upon rotation of the stem nut in a second direction to move the valve gate out of engagement with and away from the valve seat. The improvement comprises a thrust sensor positioned between the stem nut and the stem nut lock for sensing axial displacement of the stem nut in the second axial direction resulting from axial compressive thrust on the stem caused by continued rotation of the stem nut in the first direction after the valve gate is in engagement with the valve seat. A switch is operatively coupled with the thrust sensor and with the motor drive for actuation to stop the operation of the motor drive to stop rotation of the stem nut when the axial displacement of the stem nut exceeds a predetermined limit proportional to a predetermined axial compressive thrust on the stem.

4 Claims, 2 Drawing Sheets

THRUST ACTUATED CONTROL FOR MOTOR OPERATED VALVE

BACKGROUND OF THE INVENTION

The present invention relates generally to motor operated valves and, more particularly, to a control for switching off the motor of a motor operated valve when a predetermined compressive thrust is achieved within the valve stem.

Most motor operators that are employed to open and close motor operated valves, such as gate or globe valves, are controlled on the basis of the torque developed as a result of opening or closing of the valve. Motor operated valves of this type are commonly used in the utility or power generating industry and are sometimes employed as safety valves for the protection of power equipment, as well as for the protection of utility personnel and/or the general public, from the release of hazardous materials, either directly or indirectly. In general, a predetermined amount of thrust, not torque, is required to ensure that a valve of this type will properly close against severe differential pressure that may occur under an accidental or emergency condition that the valve is intended to mitigate. Thus, to the extent that the torque setpoint employed to control operation of the valve may vary from the desired thrust setpoint, a motor operated valve being controlled exclusively on the basis of torque may not achieve the level of thrust necessary for the valve to properly and/or fully close under either normal or emergency operation and, thereby, may not completely stop the flow of material through the valve. For reasons which will hereinafter be discussed in greater detail, the amount of thrust applied for a given amount of torque may vary significantly, depending upon the amount and condition of the lubricant within the valve operator or actuator, particularly, the lubricant between the valve stem and the stem nut that is driving the valve stem. In addition, with motor operated valves of the type presently employed, the amount of torque developed can vary significantly, depending upon the rate of loading. Since the rate of loading can vary substantially between a test condition where the setpoint is usually established and where no differential pressure is applied and actual operating conditions in which a substantial differential pressure may be present even with no changes in lubrication, the level of thrust can vary under operating conditions.

Clearly, a need exists for an improved control system for controlling a motor operated valve of this type, particularly for insuring that the valve is tightly closed before turning off the operator. Ideally, such a control means should be based upon thrust rather than torque and should not be affected by changes in the rate of loading. In addition, such a control system should be broadly applicable to all commonly used motor operators and motor operated valves and should be easily retrofitable to motor operated valves of this type which are already in place, particularly valves of this type within the nuclear utility industry which is most adversely affected by the above-discussed problems inherent in motor operated valves controlled on the basis of torque.

A major manufacturer of motor operators used in such valves, Limitorque Corporation, recently presented a paper to concerned nuclear industry specialists. The paper, entitled "Field Modification of Limitorque Actuators for Control of Valve Seating Thrust," the substance of which is incorporated herein by reference, suggested a change over to thrust control of such motor operators and outlined a proposed modification to achieve the change over. While the proposed modification would facilitate control of such motor operated valves based upon thrust rather than torque, the methodology and equipment proposed in this paper clearly could not be employed with some commonly used motor operated valves. In addition, because of size and weight constraints, the equipment proposed in this paper could not be readily retrofitable on most existing valves and valve operators.

The present invention, as described in greater detail below, overcomes these drawbacks of the proposal set forth in the paper by providing a thrust actuated control for a motor operated valve, which is not affected by changes in the rate of valve loading. The present invention also has broad applicability with respect to all commonly used motor operators and is easily retrofitable on existing valve operators without major system modification.

SUMMARY OF THE INVENTION

Briefly stated, the present invention comprises a thrust actuated control for use in a motor operated valve having a motor operator including motor drive means, a stem nut coupled to the motor drive means for rotation about an axis and stem nut lock means coupled to the motor drive means for preventing axial movement of the stem nut. The valve includes a valve gate, a valve seat and a valve stem coupled to the valve gate, the valve stem threadingly engaging the stem nut for axial movement in a first direction upon rotation of the stem nut in a first direction to move the valve gate toward and into engagement with the valve seat and for axial movement in a second direction upon rotation of the stem nut in a second direction to move the valve gate out of engagement with and away from the valve seat. The improvement comprises thrust sensor means positioned between the stem nut and the stem nut lock means for sensing axial displacement of the stem nut in the second axial direction resulting from axial compressive thrust on the stem caused by continued rotation of the stem nut in the first direction after the valve gate is in engagement with the valve seat. A switch means is operatively coupled with the thrust sensor means and with the motor drive means for actuation to stop the operation of the motor drive means to stop rotation of the stem nut when the axial displacement of the stem nut exceeds a predetermined limit proportional to a predetermined axial compressive thrust on the stem.

BRIEF DESCRIPTION OF THE DRAWINGS

The foregoing summary, as well as the following detailed description, will be better understood when read in conjunction with the appended drawings. For the purpose of illustrating the invention, there is shown in the drawings an embodiment which is presently preferred, it being understood, however, that this invention is not limited to the precise arrangement and instrumentalities shown. In the drawings.

DESCRIPTION OF PREFERRED EMBODIMENT

Figure 1:
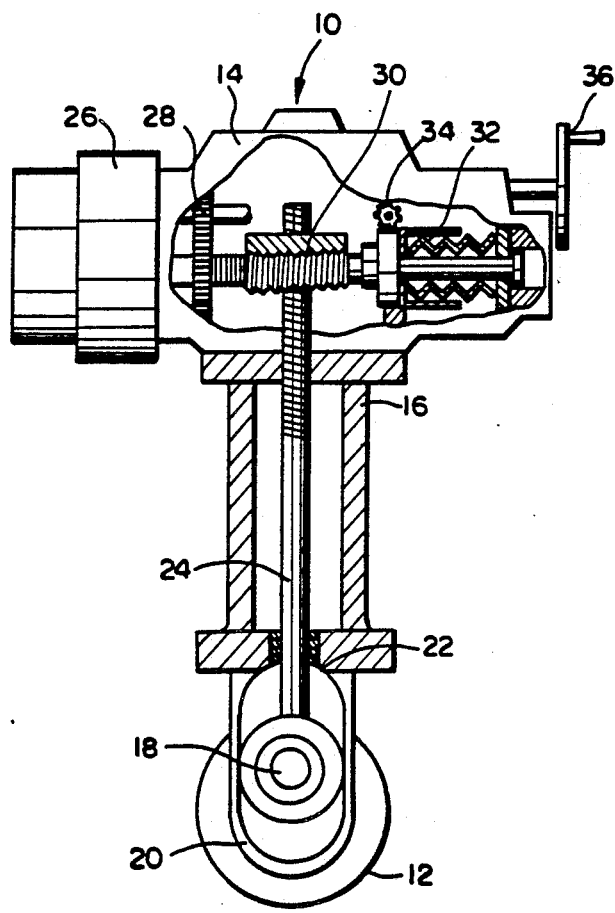
FIG. 1 is an elevational view of a motor operated gate valve shown partially in section and partially broken away with the gate partially open.

Referring now in greater detail to the drawings, in which like numerals indicate like elements throughout, there is shown in FIG. 1 an elevational view, partially broken away and partially in section, of a motor operated gate valve combination 10 of the type presently employed. The motor operated gate valve lo is a type which is generally well known in the art and is commercially available from a variety of sources. The motor operated gate valve 10 includes a valve member 12 and a valve operator 14 which are connected together by a valve yoke 16. The valve member or valve 12 includes a movable valve gate 18, a fixed valve seat 20 and a fixed valve backseat 22. The valve gate 18 is movable between a "seated" position in which it engages the valve seat 20 thereby closing the valve 12 and a "backseated" position in which it engages the valve backseat 22, thereby fully opening the valve 12. As shown in FIG. 1, the valve gate 18 is in an intermediate position part way between the seated and backseated positions.

The valve gate 18 moves between the seated and backseated positions by the action of a valve stem 24, one end of which is secured to the valve gate 18. The valve stem 24 extends through suitable openings in the valve 12 and valve yoke 16 with the other end extending into the valve operator 14, as shown.

The valve operator 14 is comprised of a motor 26 which in the present embodiment is shown as being an electric motor. The output shaft of the motor 26 is connected through suitable reduction gears 28 to a combination worm and worm gear, shown collectively as 30. The worm gear surrounds and is drivingly engaged with a drive sleeve (not shown) which in turn is drivingly engaged with a stem nut (not shown). The stem nut threadingly engages Acme type threading on the upper end of the valve stem 24. The stem nut is prevented from moving axially by a shelf on the bottom of the drive sleeve and a stem nut locking means or lock nut which is secured to the drive sleeve above the stem nut. Rotation of the drive shaft of the motor 26 results in rotation of the worm and worm gear 30, the drive sleeve and the stem nut. Since the stem nut is restrained from axial movement, rotation of the stem nut results in corresponding vertical or axial movement of the valve stem 24. The direction of movement of the valve stem 24 depends upon the direction of movement of the output shaft of the motor 26 and the corresponding direction of rotation of the stem nut. Of course, the vertical movement of the valve stem 24 results in corresponding movement of the valve gate 18. During operation, both thrust and torque exist between the valve stem 24 and the stem nut as a result of the Acme threads. As the valve gate 18 engages the valve seat 20 compressive stem thrust is absorbed by the operator housing through a tapered roller thrust bearing (not shown) at the upper end of the drive sleeve. Similarly, during unseating of the valve gate tensile valve stem thrust is returned to the housing through a similar bearing on the lower end of the drive sleeve.

The distal (rightmost) end of the worm is connected to a spring pack 32 in a manner well known in the art. A separate small gear 34 is also connected to the worm by way of the spring pack 32. The gear 34, in turn, is connected to a torque switch (not shown) for deactivating or stopping the motor 26 when the gear 34 is turned due to a displacement of the spring pack 32. Also associated with the valve operator 14 is a manual actuator 36 to permit the valve operator 14 to be operated independently of the motor 26.

The structure thus far described is typical of that of a motor operated gate valve of the type with which the present invention may be employed. It will be appreciated by those skilled in the art that the motor operated gate valve 10 is merely an illustrative example of one valve with which the present invention may be employed and that the present invention may alternatively be employed with any other type of valve (such as a globe valve) or with any other type of valve operator, such as a pneumatic or hydraulic valve operator (not shown). Further details of the structure and operation of the motor operated gate valve 10 will be presented only insofar as is necessary for an understanding of the structure and operation of the present invention as described below.

With the motor operated gate valve 10, during operation, as the valve operator 14 is developing torque on the valve stem 24 it is also developing compressive forces through the forces of the Acme threads on the valve stem 24 and stem nut. For most such threads, the thrust for a give torque is nearly halved as the friction is doubled. Since the coefficient of friction may easily vary between 0.01 and 0.02, a substantial decrease in delivered thrust may arise as lubricant between the threads is squeezed out in use or, alternatively, as such lubricant hardens due to lack of use.

In order to determine whether the valve operator is delivering sufficient closing thrust to fully seat the valve gate 18 on the valve seat 20 and thereby fully close the valve 12, a test is usually conducted under zero differential pressure conditions, primarily because of the great difficulties involved in actually placing a particular differential pressure across the valve 12. Generally, after the valve gate 18 is seated, but before the motor 26 is turned off, thrust within the valve stem 24 can build up very rapidly. Since it takes time for the worm to move in response to the force being exerted on it by the worm gear, the displacement of the spring pack 32 is usually delayed with respect to the development of such thrust or the torque. Thus, when the spring pack displacement finally gets to the position in which the torque switch is opened to deactivate the motor, the force or torque may be much higher than what it would have been had the loading been much slower. However, under severe differential pressure conditions for which the valve is supposed to achieve its specified thrust, the loading rate is substantially slowed down by the differential pressure impeding the motion of the valve gate or globe as it moves toward and engages the valve seat 20. Thus, for valves which load up rapidly when seating under no differential pressure, there may be a substantial reduction in the thrust at motor turnoff in the differential pressure condition where the thrust is really needed to properly and fully close the valve. Some comparison tests have indicated that thrust reductions of up to 30% may arise. In such situations, a motor operated valve of this type may not effectively operate to fully close the valve during an emergency condition.

The solution offered by the prior art as outlined in the above-identified publication is to replace the lock nut that keeps the stem nut from moving upwardly under compressive stem loading with an assembly that rests on the top of the stem nut, but allows the stem nut to move upwardly to compress an additional bellville spring pack. The compression of the second spring pack, which is proportional to the compressive thrust experienced by the valve stem and stem nut is then used to open a thrust actuated switch. The assembly proposed to accomplish this result is comprised of a large, fairly massive, annular housing positioned above the stem nut. The housing supports a roller element bearing, an upper annular piece which rests on the bearing and supports and guides the bellville spring elements, an upper or top plate to restrain the bellville spring elements and side supports to support the top plate from the upper surface of the operator housing. The thrust switch which is employed to deactivate the motor is mounted to the top plate and is actuated from a rod affixed to the upper annular piece. The assembly probably weighs in excess of 100 pounds, even for the smallest sized valve operator, and the use of the bellville spring assembly may still result in a lagging displacement at high load rates of the valve.

The primary drawback of the prior art system is that the total weight and size of the additional structure and the requirement of approximately a foot or more of additional space is burdensome With respect to motor operated valves already installed and functioning within existing plants, particularly nuclear power plants. In such plants, such a considerable amount of additional weight requires a new seismic analysis, which is time consuming and costly. In addition, because all of the thrust with this prior art system goes through the new bellville spring pack and is then returned back to the upper operator housing, motor operators made by other manufacturers will not be able to employ this prior art system, since their operator housings may not be designed to support such additional force.

Figure 2:
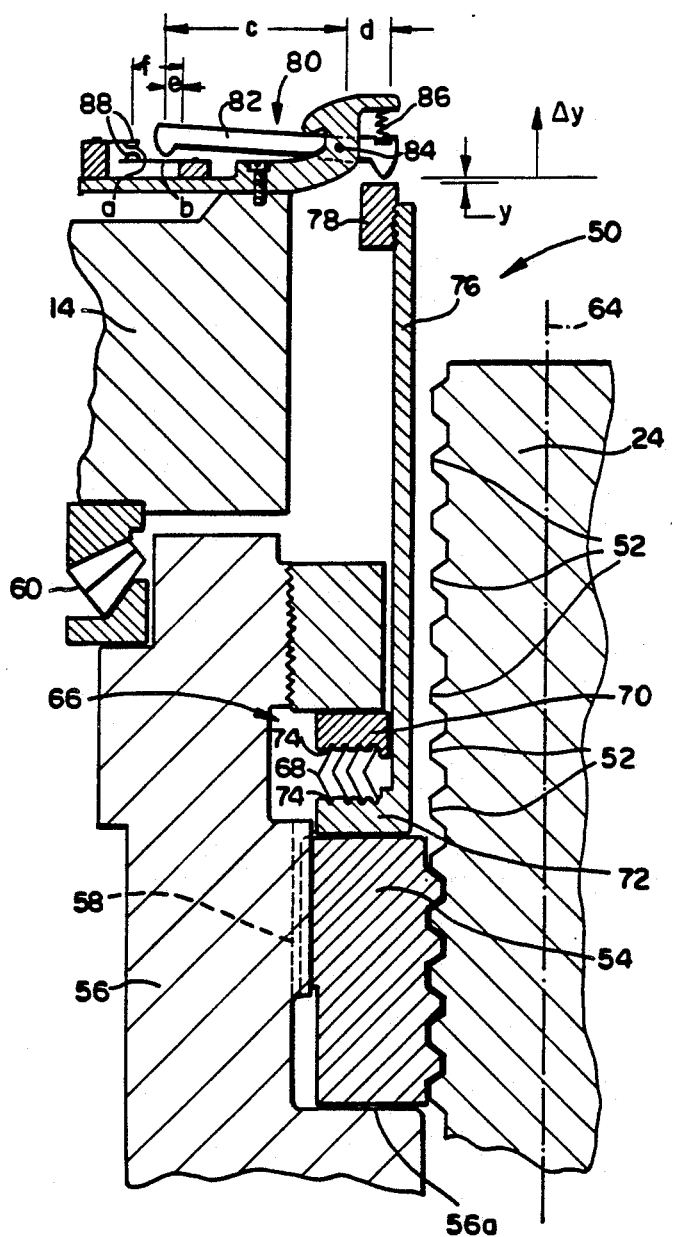
FIG. 2 is a greatly enlarged sectional view of a portion of the motor operated gate valve of FIG. 1 illustrating a preferred embodiment of the present invention.

FIG. 2 is a greatly enlarged sectional view of a portion of the valve and valve operator 10 of FIG. 1 with certain portions thereof modified to incorporate the thrust actuated control 50 of the present invention. As shown in FIG. 2, the valve stem 24 includes Acme threads 52 which engage corresponding threads on the stem nut 54. The stem nut 54 is shown as being drivingly engaged for rotation with the drive sleeve 56, in the presently preferred embodiment employing a spline connection shown in phantom as 58. As previously discussed, the drive sleeve 56 is drivingly connected to the worm (not shown in FIG. 2) for rotation upon rotation of the motor 26. As previously indicated, the drive sleeve 56 is rotatably supported by a tapered roller thrust bearing 60 secured to the operator housing 14. A stem nut lock means or lock nut 62 is threadingly secured to the drive sleeve 56 in the manner and for the reasons as discussed above. In the case of the prior art valve operator, the lock nut 62 would extend further downwardly (when viewing FIG. 2) to engage the stem nut 54. However, in the embodiment shown in FIG. 2, approximately 40% of the lock nut 62 has been removed for purposes which will hereinafter become apparent.

As will be appreciated by those skilled in the art, the drive sleeve 56, the lock nut 62 and stem nut 54 are all generally annular and rotate together about a central axis 64. As previously indicated, the stem nut 54 is prevented from moving axially downwardly by a drive sleeve shelf 56a. In this manner, rotation of the stem nut 54 in a first direction results in axial movement of the valve stem 24 in a first or downward direction, thereby moving the valve gate 18 toward and into engagement with the valve seat 20 as discussed in detail above. Correspondingly, rotation of the stem nut 54 in a second, opposite direction results in axial movement of the stem in a second or upward direction, thereby moving the valve gate 18 out of engagement and away from the valve seat 20.

A thrust sensor means or thrust sensor shown generally as 66 is positioned between the stem nut 54 and the lock nut 62. In the presently preferred embodiment, the thrust sensor is comprised of a spring assembly including a plurality of generally annular spring members 68. The spring members 68 are generally V-shaped in cross section and are oriented so that the apex of the V has the largest diameter. Preferably, the spring members are made of a high strength spring material, such as beryllium cooper or any other suitable material known to those skilled in the art.

The spring members 68 are position between a first and a second generally annular spring holders 70 and 72 respectively. The first spring holder 70 is secured to the lock nut 62 in any suitable manner well known to those skilled in the art for rotation with the lock nut 62. The second spring holder 72 engages and preferably is secured to the stem nut 54 for rotation therewith. The legs of the spring members 68 are preferably installed within suitably sized and aligned annular grooves 74 within the facing surfaces of the first and second spring holders 70 and 72 to retain the spring members in a generally parallel spaced relationship as shown in FIG. 2.

The second spring holder 72 includes a generally annular, generally axially upwardly extending extension member 76 which surrounds at least a portion of the valve stem 24. A generally annular switch actuator member 78 is threadingly secured to the axially upper end of the extension member 76. The switch actuator member 78 is positioned proximate a switch means or switch shown generally as 80, which is secured to the operator housing 14. The switch 80 is of a type well known in the art and generally commercially available and is adapted to deactivate or stop the operation of the motor to stop further rotation of the stem nut 54. The switch 80 includes a pivotally mounted striker arm 82 which pivots about pivot point 84 upon upper movement of the switch actuator member 78 against the bias of switch spring 86. Pivotal movement of the switch striker arm 82 results in the separation of switch contacts 88.

In operation, under the action of upward thrust on the stem nut 54 which is equal to the downward thrust on the valve stem 24 less minimal friction force in the stem nut to drive sleeve spline 58, the stem nut 54 pushes in the second axial direction (upwardly when viewing FIG. 2) against the second spring holder 72, thereby compressing the spring elements 68. The compression of the spring elements 68 results in an upper displacement of the stem nut 54 and the second spring holder 72. Of course, the displacement of the second spring holder 72 results in a corresponding upward displacement of the extension member 76 and the switch actuator member 78. The upward displacement of each of these elements is directly proportional to the upward thrust on the stem nut 54. The size, thickness and number of spring elements is selected so that displacement of the foregoing elements will be at least 0.1 inch upon the application of full rated thrust from the valve operator. The switch actuator member 78 may be adjusted with respect to the extension member 76 so that the switch actuator member actuates the switch 80 at the desired stem nut thrust. As previously indicated, upon actuation of the switch 80, contacts 88 are separated and the motor 26 is deactivated or stopped, thereby stopping rotation of the stem nut 54. In the embodiment shown, once contact is made between the switch actuator member 78 and the switch striker arm 82, any further upward displacement of the switch actuator member 78 results in amplified displacement between the switch contact 88 once the striker arm has been moved a small distance (b). It should be appreciated by those skilled in the art that the essential feature of the present invention is the direct return of the thrust from the stem nut 54 to the drive sleeve 56 after the spring assembly so that the original force path beyond the drive sleeve 56 is maintained. It should also be appreciated that the present invention can be easily retrofitted within existing motor operated valve structures without the need for substantial modifications and without the addition of any significant weight. Moreover, the additional space requirements for the present invention are negligible, and the present invention can be installed and employed in virtually any type of motor operated valve.

From the foregoing description, it can be seen that the present invention comprises a thrust actuated control system for a motor operated valve which facilitates control of the valve utilizing thrust and which is easily adaptable and retrofitable to motor operated valves. It will be appreciated by those skilled in the art that changes could be made to the embodiment described above without departing from the broad inventive concept thereof. It is understood, therefore, that this invention is not limited to the particular embodiment disclosed, but it is intended to cover all modifications which are within the scope and spirit of the invention as defined by the appended claims.

I claim:

1. In a motor operated valve, having a motor operator including motor drive means having a motor, a worm, a worm gear and a drive sleeve, a stem nut coupled to and surrounded by the drive sleeve for rotation about an axis and stem nut lock means coupled to the drive sleeve for preventing axial movement of the stem nut, the valve including a valve gate, a valve seat and a valve stem coupled to the valve gate, the valve stem threadingly engaging the stem nut for axial movement in a first direction upon rotation of the stem nut in a first direction to move the valve gate toward and into engagement with the valve seat and for axial movement in a second direction upon rotation of the stem nut in a second direction to move the valve gate out of engagement with and away from the valve seat, wherein the improvement comprises:

a thrust actuated control including thrust sensor means comprising a mechanical spring assembly positioned between the stem nut and the stem nut lock means for facilitating and sensing axial displacement of the stem nut in the second axial direction resulting from axial compressive thrust on the stem and for returning thrust from the stem nut directly to the drive sleeve so that the force path beyond the drive sleeve is the same as it would have been without the thrust sensor means; and switch means operatively coupled with the thrust sensor means and with the motor for actuation to stop the operation of the motor to stop rotation of the drive sleeve and the stem nut when the axial displacement of the stem nut exceeds a predetermined limit proportional to a predetermined compressive thrust on the stem.

2. The control as recited in claim 1 wherein the spring assembly includes at least one spring member, the spring member being compressed in proportion to the axial movement of the stem nut in the second axial direction.

3. The control as recited in claim 2 wherein:

the spring assembly includes a first spring holder coupled to the stem nut lock means and a second spring holder coupled with the switch means and engaging the stem nut for axial movement therewith and wherein the at least one spring member extends between the first and second spring holders whereby movement of the stem nut in the second axial direction moves the second spring holder toward the first spring holder to compress the spring member;

wherein the switch means is positioned at a location remote from the spring assembly; and wherein the spring assembly further includes a generally tubular extension member surrounding at least a portion of the valve stem for coupling the second spring holder with the switch means whereby a predetermined movement of the second spring holder toward the first spring holder results in actuation of the switch means.

4. The control as recited in claim 3 wherein the spring assembly includes a plurality of spaced spring members, the size, thickness and number of spring members being selected so that displacement of the second spring holder results from the application of the full rated thrust of the valve operator.

* * * * *